US010275240B2

(12) United States Patent
Kogan et al.

(10) Patent No.: US 10,275,240 B2
(45) Date of Patent: Apr. 30, 2019

(54) DEPENDENCY RANK BASED ON COMMIT HISTORY

(71) Applicant: HEWLETT PACKARD ENTERPRISE DEVELOPMENT LP, Houston, TX (US)

(72) Inventors: Olga Kogan, Yehud (IL); Amit Levin, Yehud (IL)

(73) Assignee: ENTIT SOFTWARE, LLC, Sanford, NC (US)

(*) Notice: Subject to any disclaimer, the term of this patent is extended or adjusted under 35 U.S.C. 154(b) by 0 days.

(21) Appl. No.: 15/574,387

(22) PCT Filed: May 28, 2015

(86) PCT No.: PCT/US2015/032923
§ 371 (c)(1),
(2) Date: Nov. 15, 2017

(87) PCT Pub. No.: WO2016/190876
PCT Pub. Date: Dec. 1, 2016

(65) Prior Publication Data
US 2018/0136933 A1 May 17, 2018

(51) Int. Cl.
G06F 9/44 (2018.01)
G06F 8/77 (2018.01)
(Continued)

(52) U.S. Cl.
CPC ............... G06F 8/77 (2013.01); G06F 8/433 (2013.01); G06F 9/46 (2013.01); G06F 9/466 (2013.01);
(Continued)

(58) Field of Classification Search
CPC ... G06F 8/77; G06F 8/433; G06F 9/46; G06F 9/466; G06F 17/30106; G06F 17/30377; G06F 17/30572; G06F 17/30958
See application file for complete search history.

(56) References Cited

U.S. PATENT DOCUMENTS 8,495,100 B2   7/2013  Cheung
9,785,421 B1 * 10/2017  Neatherway ............ G06F 8/433
(Continued)

OTHER PUBLICATIONS

Vinayak Sinha et al., Analyzing Developer Sentiment in Commit Logs, IEEE, 2016, retrieved online on Dec. 6, 2018, pp. 520-523. Retrieved from the Internet: <URL: http://delivery.acm.org/10.1145/2910000/2903501/p520-sinha.pdf?>. (Year: 2016).*
(Continued)

Primary Examiner — Hanh Thi-Minh Bui

(57) ABSTRACT

In one example implementation, an example system includes a dependency engine, a filter engine, and a cluster engine. In the one example implementation, a file pair of a first commit log entry of a plurality of commit log entries in a commit history is identified by the dependency engine. In the one example implementation, a dependency rank is assigned to the file pair by the dependency engine based on a number of times the first file of the file pair and the second file of the file pair appear together in the plurality of commit log entries. In the one example implementation, a dependency rank is compared to a confidence rank by the filter engine. In the one example implementation, a second file is indicated as dependent on a first file when the dependency rank of the file pair achieves the confidence rank.

15 Claims, 5 Drawing Sheets

(51) Int. Cl.
  *G06F 9/46* (2006.01)
  *G06F 8/41* (2018.01)
  *G06F 17/30* (2006.01)

(52) U.S. Cl.
  CPC .. *G06F 17/30106* (2013.01); *G06F 17/30377* (2013.01); *G06F 17/30572* (2013.01); *G06F 17/30958* (2013.01)

(56) References Cited

U.S. PATENT DOCUMENTS

| | | |
|---|---|---|
| 2004/0177244 A1 | 9/2004 | Murphy et al. |
| 2008/0104570 A1 | 5/2008 | Chedgey et al. |
| 2008/0201705 A1 | 8/2008 | Wookey |
| 2012/0296878 A1 | 11/2012 | Nakae et al. |
| 2014/0109106 A1 | 4/2014 | Fanning et al. |
| 2014/0123108 A1 | 5/2014 | Cheluvaraju et al. |
| 2015/0278339 A1* | 10/2015 | Cherukuri ......... G06F 17/30598 707/738 |

OTHER PUBLICATIONS

Hu, D.J., et al., Latent Variable Models for Predicting File Dependencies in Large-Scale Software Development, University of California, Jun. 14, 2011, 9 pages.

Lev Gimelfarb, Software Versioning Strategies, Mar. 9, 2014, 38 pages http://www.lionhack.com/2014/03/09/software-versioning-strategies/.

Tejinder Dhaliwal, et al., Recovering Commit Dependencies for Selective Code Integration in Software Product Lines, Jul. 13, 2012, 10 pages http://sail.cs.queensu.ca/publicatic.

International Searching Authority., International Search Report and Written Opinion dated Mar. 31, 2016 for PCT Application No. PCT/US2015/032923 Filed May 28, 2015, 13 pages.

\* cited by examiner

DEPENDENCY RANK BASED ON COMMIT HISTORY

BACKGROUND

Software development of code projects may demand organization of files and management software of the source code may be used to manage the code as it changes over time. For example, a version control system (e.g., a source control tool) may refer to changes in the source code to a repository where developers may update a latest version of code and allow multiple developers to work on a project concurrently.

DETAILED DESCRIPTION

In the following description and figures, some example implementations of dependency identification apparatus, dependency identification systems, and/or methods for finding a dependency of files in a project are described. Software development projects may be managed with a lack of understanding of design and dependencies, such as when each developer of the project knows the particular dependencies, but that information is not always communicated to other developers. Thus, the design information and the dependency information may be scattered across developers of a process. As files of the project are revised over time, commonly by multiple developers, the complexity of the source code for a project may increase as well as the effort in maintaining familiarity with the code. To understand dependencies in the source code, a developer may spend time reviewing the code, relying on documentation produced by other developers, executing static code analysis tools to identify the dependency information, or some combination thereof.

Various examples described below relate to analyzing the commit history to identify dependency information based on developer's commits. By identifying an association of files based on files committed together for a commit and using a number of distinct developers, a dependency among files may be identified. As described herein, a dependency rank may be associated with a pair of files and based on the level of the dependency rank, then the files may be identified as dependent on each other. For example, if the dependency rank achieves a value with which confidence may be had in their dependency, which discussed herein as a comparison with a confidence rank. Errors based on a single developer's coding strategy may be subsided by utilizing the number of distinct developers committing the same file pair. As used herein, a file pair is a representation to identify a group of files as distinct from another group of files.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus.

Figure 1:
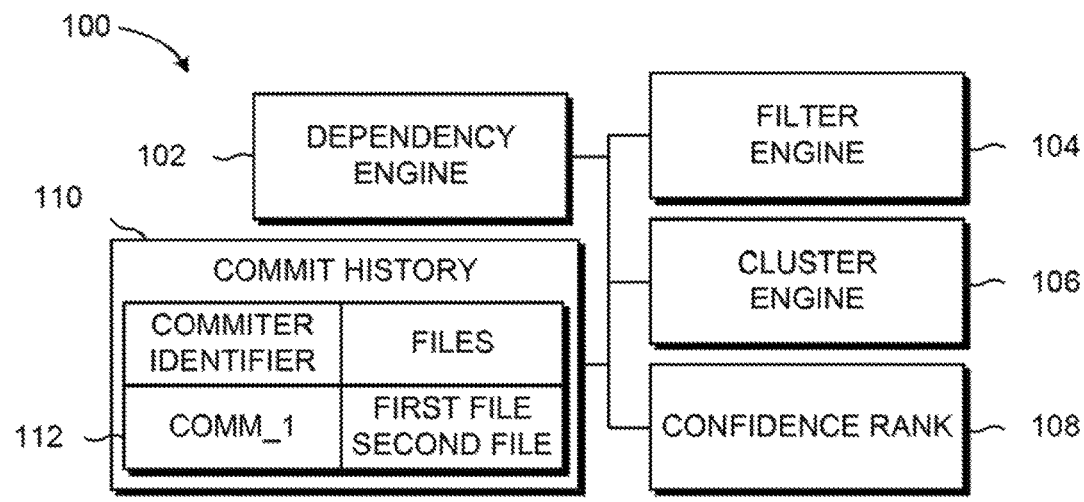
FIGS. 1 and 2 are block diagrams depicting example dependency identification systems.
Figure 2:
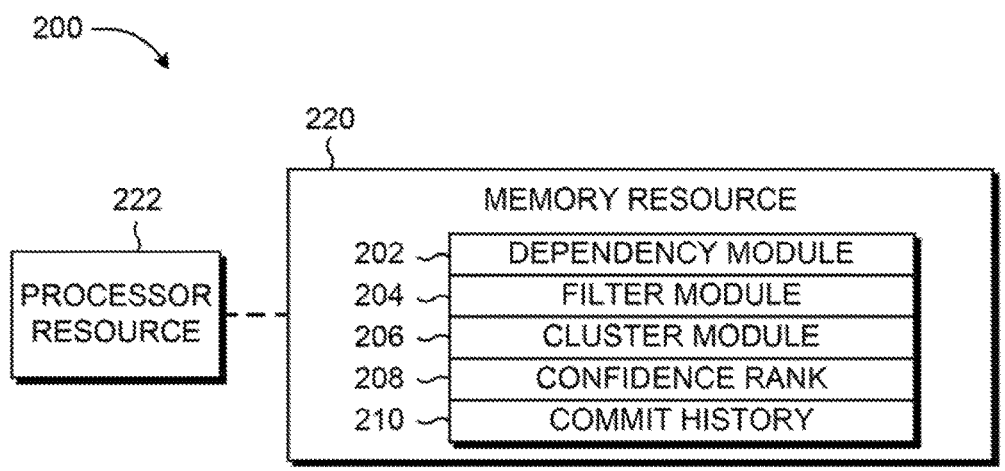

FIGS. 1 and 2 are block diagrams depicting example dependency identification systems 100 and 200. Referring to FIG. 1, the example dependency identification system 100 of FIG. 1 generally includes a dependency engine 102, a filter engine 104, and a cluster engine 106. In general, a group of files may be identified as dependent on each other by a cluster engine 106 where the dependency engine 102 associates a dependency rank with the files that are committed together and the filter engine 104 filters files based on the dependency rank using a confidence rank 108. The example commit history 110 is simplified in FIG. 1 and generally would contain a plurality of commit log entries, such as commit log entry 112.

The dependency engine 102 represents any circuitry or combination of circuitry and executable instructions to associate a dependency rank with files that are committed together in a commit history. The dependency rank has a relationship with the number of times a pair of files appear together in the commit history. The dependency engine 102 may take into account the diversity of the developers performing the commits. An entity (e.g., a developer) that performs a commit is discussed as a "committer" herein. For example, the dependency engine 102 may represent a combination of circuitry and executable instructions to identify a file pair of a first commit log entry of a plurality of commit log entries in a commit history and assign a dependency rank to the file pair based on a number of times a first file of the file pair and a second file of the file pair appear together in the plurality of commit log entries and a number of distinct committers that commit the first file and the second file together.

The file pairs may be identified by the dependency engine 102 by, for example, making a file pair for each two-file combination of the plurality of files listed in a commit log entry. A commit log entry, as used herein, represents a data structure containing information of a commit. For example, the commit log entry may be a data structure that includes fields for a committer identifier and a plurality of files. For another example, the commit log entry may be a data structure comprising fields for a commit identifier, a committer identifier, a commit time, and a list of files of the commit. As used herein, a commit identifier represents a number, a character, a string, a label, or other distinctive value that represents a commit log entry and a committer identifier represents a number, a character, a string, a label, or other distinctive value that represents the entity performing the commit, such as a name of the committer or an employee identification number of the committer.

A dependency rank, as used herein, represents a number, a character, a string, a category, a label, or any other identifier that represents a comparable value associated with the number of times a file is committed with another file. As mentioned above, the dependency rank is assigned based on the number of commits that contain the file pair being assigned the dependency rank and the number of distinct committers that perform the number of commits. The weight given to those factors may be adjusted according to the project and/or attributes of the commit history. A weight function may be used to determine the dependency rank. For example, the dependency engine 102 may determine the dependency rank as a weighted value based on a weight function using a set of parameters comprising a number of commits, a number of distinct committers that perform the commits, and a time decay function (e.g., where the time decay function emphasizes a first commit that is committed more recently than a second commit with a greater weighted value than the second commit). The weight function may perform weighting of the dependency rank (e.g., weight parameters of the weight function) based on the diversity of the committers and/or the diversity of the commit times. For example, the weight function may at least one of weight the dependency rank based on a number of distinct committers identified by a plurality of commit log entries that include the first file and the second file and/or weight the dependency rank based on a comparison of a time window to a commit time of the commit log entry.

Figure 7:
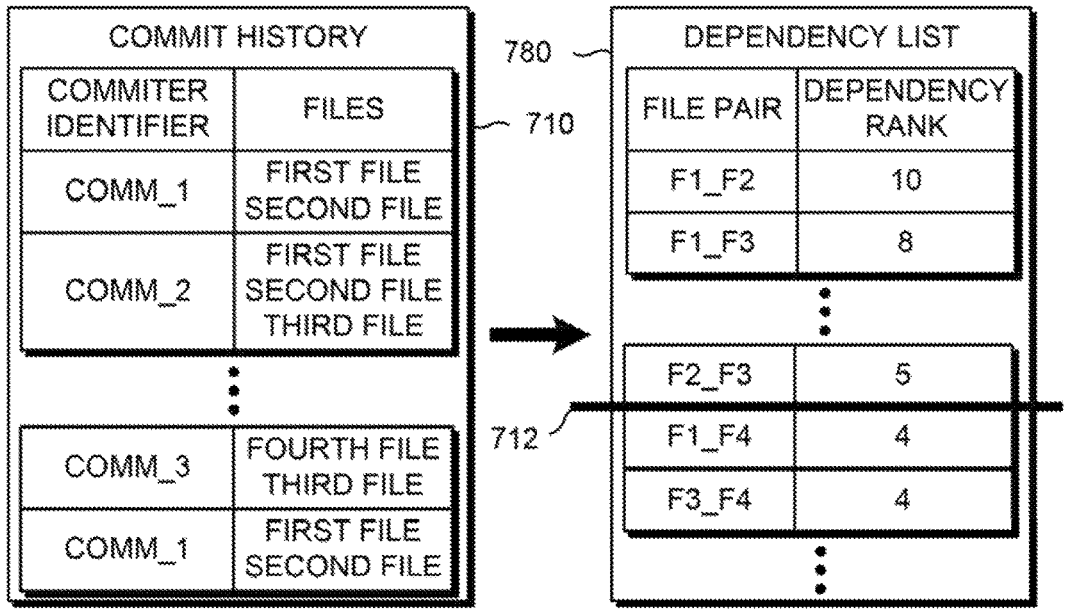
FIG. 7 depicts an example commit history and an example dependency list based on the example commit history.

The dependency engine 102 may produce a dependency list based on the identified file pairs and the dependency ranks assigned to the file pairs. The dependency list may be used to identify a file that depends on another file while taking into consideration the dependency rank. As an example, FIG. 7 depicts an example dependency list 780 formed by a dependency identification system, such as dependency identification system 100, using the data of the commit history 710 where the file pairs are listed in order of dependency rank and a file or a file pair may be searched for in the dependency list.

Figure 8:
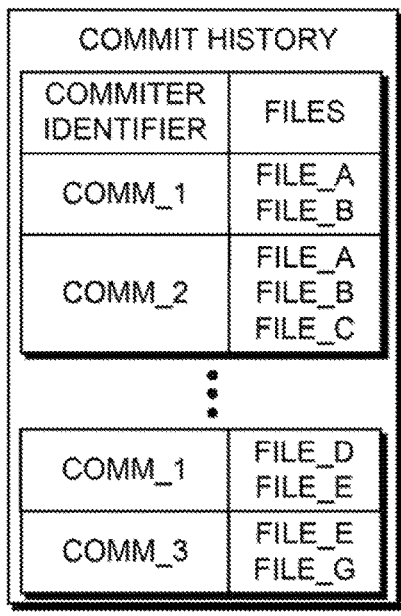
FIG. 8 depicts an example commit history and example dependency graphs based on the example commit history.

The dependency engine 102 may represent circuitry or a combination of circuitry and executable instructions to manage a dependency graph based on a commit history, where the dependency graph is usable, for example, to identify a file pair and assign a dependency rank to the file pair. The dependency graph may comprise nodes and edges where each node represents a file of the commit history and each edge represents a file pair and is associated with a dependency rank correlated with the file pair. For example, the dependency engine 102 may represent a combination of circuitry and executable instructions to create a dependency graph comprising a first node that represents the first file of a first plurality of files of a first commit log entry in a commit history, create a first edge between the first node and a second node that represents a second file of the first plurality of files of the first commit log entry, and increase a dependency rank of the first edge when a second commit log entry of the plurality of commit log entries contains a second plurality of files comprising the first file and the second file. Referring to FIG. 8, a commit history 810 may be used by the system 100 to form a graph 882 that represents files of a plurality of commit log entries of the commit history 810 as nodes and file pairs of the plurality of commit log entries as edges.

The dependency engine 102 may represent circuitry or a combination of circuitry and executable instructions to examine the files of a commit log entry and identify a related code in the files of the commit log entry. For example, the dependency engine 102 may represent a combination of circuitry and executable instructions to retrieve code of files of the commit log entry, identify a code pair based on changes to a first file and a second file in the commit log entry, determine a regularity of the code pair based on a number of times the code pair appears in the commit history, and determine the dependency rank associated with the file pair based on the regularity. A code pair, as used herein, refers to a pair of sections of code that are changed in the files of the file pair compared to the previously committed versions of the files. For example, a first function of a first file may be changed in a commit where a second function is changed of a second file. Thus, the dependency engine 102, may for example, identify a code pair when a first section of code changes in the first file and a second section of code changes in the second file, determine a regularity of the code pair based on a number of times the first section of code and the second section of code change together in the commit history, and modify a dependency rank of the file pair using the regularity (e.g. increase the dependency rank when the regularity is relatively high or decrease the dependency rank when the regularity is relatively low). As used herein, a regularity represents a number, a character, a string, a label, or other comparable value that indicates an amount of times the code pair changes together in the commit history (e.g., a rate that a first section of code in a first file of the project changes with a second section of code in a second file). The code pairs may be used as part of the dependency information, such as in building the dependency graph. For example, by using code pair information, the dependency ranks may be associated with a pair of file and function combinations where the nodes in the dependency graph represent a combination of a file and a section of code in the file and the edges represent a file pair/code pair with second combination of a file and a section of code. In this manner, a greater granularity of dependency may be identified because the analysis of the files committed together are analyzed deeper.

The filter engine 104 represents any circuitry or combination of circuitry and executable instructions to filter a dependency rank based on a confidence rank. For example, the filter engine 104 may represent a combination of circuitry and executable instructions to compare the dependency rank of the file pair to a confidence rank and disregard any file pairs that do not achieve the confidence rank. As used herein, a confidence rank is a number, a character, a string, a label, or other value to represent a threshold of confidence that the dependence rank indicates an actual dependency. For example, if a file pair is committed only once in the commit history then there would be a low confidence in that files of the file pair are indeed dependent on each other and might instead, have been committed together merely based on the method of development by a particular developer. In this manner, the filter engine 104 may, for example, identify file pairs that have a sufficient reliability of being dependent on each file of the file pair.

The filter engine 104 may, for example, represent circuitry or a combination of circuitry and executable instructions to identify unreliable file pairs using the confidence rank and removes the file pairs from the possible results of the system 100 or otherwise indicates the unreliability the file pair as having a dependency. For example, the filter engine 104 may represent a combination of circuitry and executable instructions to flag or otherwise indicate that a file pair does not achieve a confidence rank. For another example, the filter engine 104 may represent a combination of circuitry and executable instructions to remove the first edge from the dependency graph when the dependency rank is below a confidence rank. For yet another example, the filter engine 104 may represent a combination of circuitry and executable instructions to change a visual characteristic of a node and/or edge associated with the file pairs that do not achieve the confidence rank. Referring to FIG. 7, a divider 712 is shown as a representation of a "cut off" point of confidence of file pairs actually having a dependency where the division is at the dependency rank of five. Thus, in that example, the file pairs having a dependency rank of five or above achieve the confidence rank. Referring to FIG. 8, a filter engine, such as filter engine 104, may form the graphs of 884 from the graph 882 by removing edges that do not achieve a confidence rank. In the example of FIG. 8, the edges having a dependency rank of four have been removed. Edge removal is an example form of a visual indication that an edge does not achieve a confidence rank. Other example visual indication include a change in the opacity, a change in color, an addition of an icon, an addition of a divider, etc.

A confidence rank may be set by the system 100, by a user or administrator of the system 100, by a machine learning technique, or some other way to identify a division between file pairs that are more likely to have an actual code dependency than file pairs who may be merely committed at the same time. The confidence rank may be based on a project attribute of a project associated with the commit history, such as a number of commit log entries in the commit history. As used herein, a project attribute may be any characterization of the project and may represent (and/or incorporate) a plurality of project attributes. For example, the project attribute may be at least one of a project size, a number of total commits of the project, a number of changes of a section of the project, and/or a number of developers of the project.

The cluster engine 106 represents any circuitry or combination of circuitry and executable instructions to indicate the second file is dependent on the first file when the first file pair achieves the confidence rank. For example, the cluster engine 106 may represent a combination of circuitry and executable instructions to identify a cluster of nodes that are connected in the dependency graph and cause the cluster of nodes to display. In the example of file pair removal by the filter engine 104, the cluster engine 106 may indicate the file dependencies by providing the file pairs that achieve the confidence rank, such as in a dependency list or a dependency graph. Dependency and/or the degree of dependency (as indicated by the, for example, the relative differences in dependency ranks) among files may be indicated, for example, by an identifier, an icon, a font or font style, a color, an opacity, an edge of a graph, a distance between nodes in a graph, or other visual indication.

In the example of providing a dependency graph, the cluster engine 106 may represent any circuitry or combination of circuitry and executable instructions to identify nodes of a cluster that are not a file pair in the commit history. For example, the cluster engine 106 may identify a cluster of nodes in the dependency graph based on edges of nodes of the cluster and identify a third node that lacks a direct edge to a first node when the cluster of nodes includes a first node, a second node, and a third node.

When the cluster engine 106 identifies the indirect relationship between files (e.g., the nodes of the files are in the same cluster but are not directly connected by an edge in the graph representation), the cluster engine 106 may identify that the cluster of nodes represents a plurality of dependency clusters and should be separated into a plurality of sub-graphs. The cluster engine 106 may represent circuitry or a combination of circuitry and executable instructions to split the cluster of nodes into a plurality of sub-graphs. For example, the cluster engine 106 may represent a combination of circuitry and executable instructions to separate the cluster into a plurality of sub-graphs based on nodes of the cluster that do not have a direct connection where some nodes in the dependency graph may be duplicated.

Because nodes may be shared among the final sub-graphs, the clusters having shared nodes may be duplicated. For example, a cluster may be duplicated wherein the shared nodes among a first sub-graph of the plurality of sub-graphs and a second sub-graph of the plurality of sub-graphs are duplicate graphs. The cluster engine 106 may trim the nodes and edges of the duplicate graphs to create different sub-graphs. For example, the cluster engine 106 may remove a first node representing a first file of a file pair from a first duplicate sub-graph and remove a second node representing a second file of a file pair from a second duplicate sub-graph where the resulting sub-graphs include a first sub-graph of the plurality of sub-graphs that comprises the first node, the second node, and the first edge connecting the first node and second node and a second sub-graph of the plurality of sub-graphs that comprising the second node, the third node, and a second edge connecting the second node and the third node. Referring to FIG. 8, the graphs 886 represent the sub-graphs of the filtered dependency graph of 884, where the nodes representing files E and H have been duplicated and the nodes G and F are removed from one graph (due to no direct edge with node D) and the node D removed from the other graph. For another example, sub-graphs may indicate architecture cross-layer dependencies such as in detecting a cluster of application programming interface (API) functionalities that depend on changes in external and internal API code. By identifying dependencies and narrowing the dependencies, confidence may be had in the results of the dependency identification system 100. For example, the dependency identification system 100 may take into account not just an overall number of times a file pair is committed in a commit history, but also the number of distinct committers, a time window, and code pair information (e.g., the regularity of a code pair committed in the commit history) to determine a dependency rank when indicating a dependency based on a comparison of a dependency rank to a confidence rank as described herein.

Figure 3:
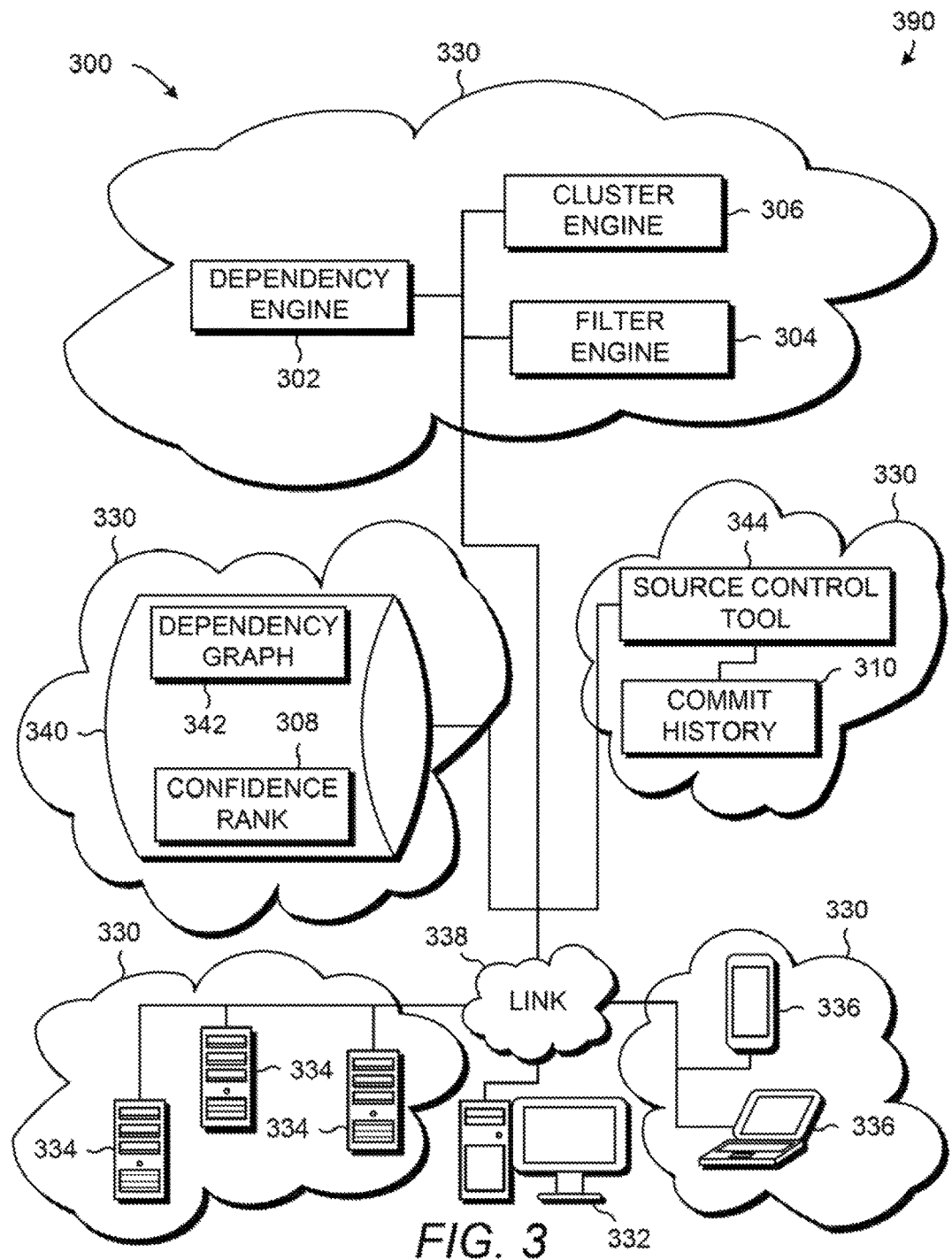
FIG. 3 depicts an example environment in which various dependency identification systems may be implemented.

In some examples, functionalities described herein in relation to any of FIGS. 1-3 may be provided in combination with functionalities described herein in relation to any of FIGS. 4-8.

FIG. 2 depicts the example system 200 may comprise a memory resource 220 operatively coupled to a processor resource 222. Referring to FIG. 2, the memory resource 220 may contain a set of instructions that are executable by the processor resource 222 as well as any data used by the system 200. For example, the memory resource 220 may contain a set of instructions, a confidence rank 208, and a commit history 210. The set of instructions are operable to cause the processor resource 222 to perform operations of the system 200 when the set of instructions are executed by the processor resource 222. The set of instructions stored on the memory resource 220 may be represented as a dependency module 202, a filter module 204, and a cluster module 206. The dependency module 202, the filter module 204, and the cluster module 208 represent program instructions that when executed function as the dependency engine 102, the filter engine 104, and the cluster engine 108 of FIG. 1, respectively. The processor resource 222 may carry out a set of instructions to execute the modules 202, 204, 206, and/or any other appropriate operations among and/or associated with the modules of the system 200. For example, the processor resource 222 may carry out a set of instructions to modify a dependency rank of an edge of a dependency graph when a commit log entry contains a first file and a second file and the first file is represented by a first node of the dependency graph connected by the edge to a second node of the dependency graph representing the second file, compare the dependency rank to a confidence rank, and indicate the first file and the second file have a dependency when the dependency rank achieves the confidence rank. For another example, the processor resource 222 may create a dependency graph by carrying out a set of instructions to add a first node and a second node to the dependency graph when the commit log entry contains a plurality of files that includes the first file and the second file (and the dependency graph does not already include the first node and the second node) and create the edge between the first node and the second node.

Figure 4:
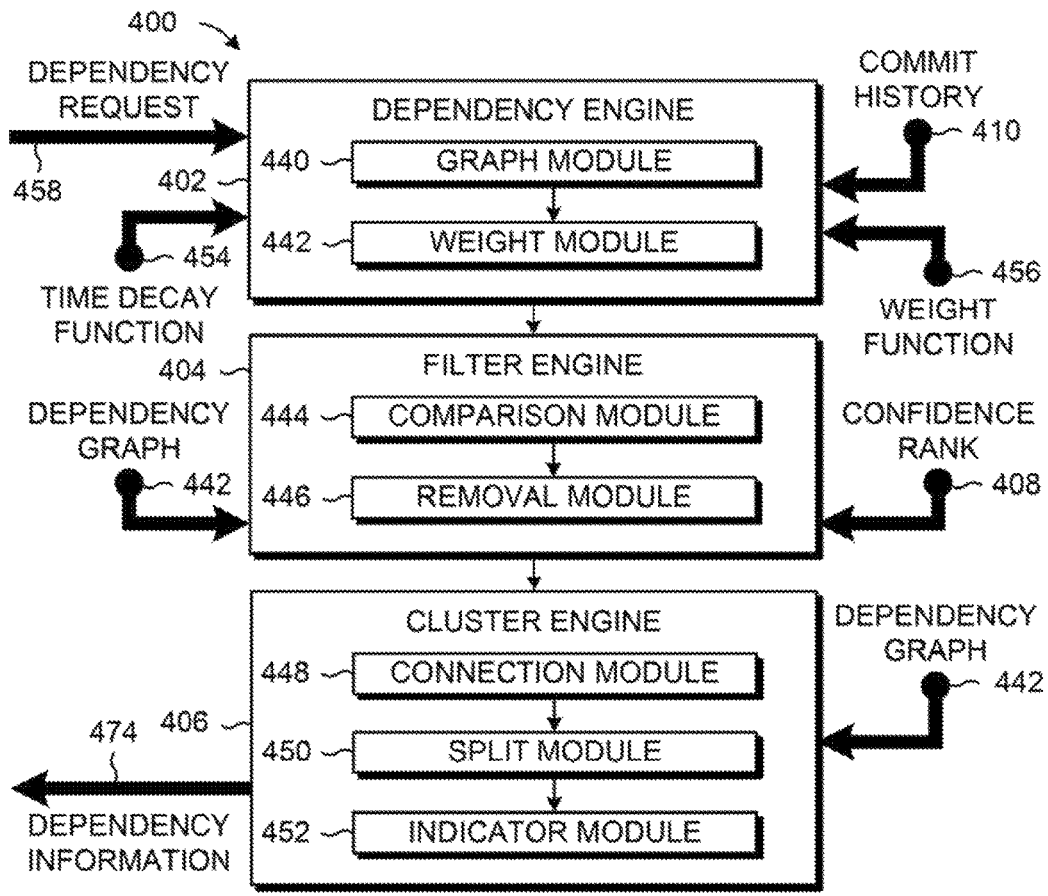
FIG. 4 depicts example interaction by example components used to implement an example dependency identification system.

Although these particular modules and various other modules are illustrated and discussed in relation to FIG. 2 and other example implementations, other combinations or sub-combinations of modules may be included within other implementations. Said differently, although the modules illustrated in FIG. 2 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules. FIG. 4 depicts yet another example of how functionality may be organized into engines and/or modules.

The processor resource 222 is any appropriate circuitry capable of processing (e.g., computing) instructions, such as one or multiple processing elements capable of retrieving instructions from the memory resource 220 and executing those instructions. For example, the processor resource 222 may be a central processing unit (CPU) that enables finding a dependency of files in a project by fetching, decoding, and executing modules 202, 204, and 206. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). The processor resource 222 may include multiple processing elements that are integrated in a single device or distributed across devices. The processor resource 222 may process the instructions serially, concurrently, or in partial concurrence.

The memory resource 220 represents a medium to store data utilized and/or produced by the system 200. The medium is any non-transitory medium or combination of non-transitory media able to electronically store data, such as modules of the system 200 and/or data used by the system 200. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. The memory resource 220 may be said to store program instructions that when executed by the processor resource 222 cause the processor resource 222 to implement functionality of the system 200 of FIG. 2. The memory resource 220 may be integrated in the same device as the processor resource 222 or it may be separate but accessible to that device and the processor resource 222. The memory resource 220 may be distributed across devices.

In the discussion herein, the engines 102, 104, and 106 of FIG. 1 and the modules 202, 204, and 206 of FIG. 2 have been described as circuitry or a combination of circuitry and executable instructions. Such components may be implemented in a number of fashions. Looking at FIG. 2, the executable instructions may be processor-executable instructions, such as program instructions, stored on the memory resource 220, which is a tangible, non-transitory computer-readable storage medium, and the circuitry may be electronic circuitry, such as processor resource 222, for executing those instructions. The instructions residing on the memory resource 220 may comprise any set of instructions to be executed directly (such as machine code) or indirectly (such as a script) by the processor resource 222.

In some examples, the system 200 may include the executable instructions may be part of an installation package that when installed may be executed by the processor resource 222 to perform operations of the system 200, such as methods described with regards to FIGS. 4-8. In that example, the memory resource 220 may be a portable medium such as a compact disc, a digital video disc, a flash drive, or memory maintained by a computer device, such as a service device 334 of FIG. 3, from which the installation package may be downloaded and installed. In another example, the executable instructions may be part of an application or applications already installed. The memory resource 220 may be a non-volatile memory resource such as read only memory (ROM), a volatile memory resource such as random access memory (RAM), a storage device, or a combination thereof. Example forms of a memory resource 220 include static RAM (SRAM), dynamic RAM (DRAM), electrically erasable programmable ROM (EEPROM), flash memory, or the like. The memory resource 220 may include integrated memory such as a hard drive (HD), a solid state drive (SSD), or an optical drive.

FIG. 3 depicts example environments in which various example dependency identification systems may be implemented. The example environment 390 is shown to include an example system 300 for finding a dependency of files in a project. The system 300 (described herein with respect to FIGS. 1 and 2) may represent generally any circuitry or combination of circuitry and executable instructions to find a dependency of files in a project. The system 300 may include a dependency engine 302, a filter engine 304, and a cluster engine 306 that are the same as the dependency engine 102, the filter engine 104, and the cluster engine 106 of FIG. 1, respectively, and the associated descriptions are not repeated for brevity. As shown in FIG. 3, the engines 302, 304, and 308 may be integrated into a compute device, such as a service device 334. The engines 302, 304, and 306 may be integrated via circuitry or as installed instructions into a memory resource of the compute device.

The example environment 390 may include compute devices, such as developer devices 332, service devices 334, and user devices 336. A first set of instructions may be developed and/or modified on a developer device 332. For example, an application may be developed and modified on a developer device 332, committed to a repository via a source control tool 344, and stored onto a repository server, such as a service device 334. The service devices 334 represent generally any compute devices to respond to a network request received from a user device 336, whether virtual or real. For example, the service device 334 may operate a combination of circuitry and executable instructions to provide a network packet in response to a request for data, a page, or functionality of an application. The user devices 336 represent generally any compute devices to communicate a network request and receive and/or process the corresponding responses. For example, a browser application may be installed on the user device 336 to receive the network packet from the service device 334 and utilize the payload of the packet to display an element of a page via the browser application.

The compute devices may be located on separate networks 330 or part of the same network 330. The example environment 390 may include any appropriate number of networks 330 and any number of the networks 330 may include a cloud compute environment. A cloud compute environment may include a virtual shared pool of compute resources. For example, networks 330 may be distributed networks comprising virtual computing resources. Any appropriate combination of the system 300 and compote devices may be a virtual instance of a resource of a virtual shared pool of resources. The engines and/or modules of the system 300 herein may reside and/or execute "on the cloud" (e.g., reside and/or execute on a virtual shared pool of resources).

A link 338 generally represents one or a combination of a cable, wireless connection, fiber optic connection, or remote connections via a telecommunications link, an infrared link, a radio frequency link, or any other connectors of systems that provide electronic communication. The link 338 may include, at least in part, intranet, the Internet, or a combination of both. The link 338 may also include intermediate proxies, routers, switches, load balancers, and the like.

The data store 340 may contain information utilized by the engines 302, 304, and 306. For example, the data store 340 may store a confidence rank 308 and a dependency graph 342.

Referring to FIGS. 1-3, the engines 102, 104, and 106 of FIG. 1 and/or the modules 202, 204, and 206 of FIG. 2 may be distributed across devices 332, 334, 336, or a combination thereof. The engine and/or modules may complete or assist completion of operations performed in describing another engine and/or module. For example, the dependency engine 302 of FIG. 3 may request, complete, or perform the methods or operations described with the dependency engine 102 of FIG. 1 as well as the filter engine 104 and the cluster engine 106 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. In some example, the engines of the system 300 may perform example methods described in connection with FIGS. 4-8.

FIG. 4 depicts example interaction by example components used to implement an example dependency identification system 400. Referring to FIG. 4, the example engines of FIG. 4 generally include a dependency engine 402, a filter engine 404, and a cluster engine 406 that may represent the same engines as the dependency engine 102, the filter engine 104, and the cluster engine 106 of FIG. 1, respectively. The example engines/modules of FIG. 4 may be implemented on a compute device, such as a service device 334 of FIG. 3.

The example system 400 of FIG. 4 is initiated with a dependency request 450. The example dependency engine 402 uses program instructions, such as a graph module 440 and a weight module 442, to facilitate identification of file pairs in the commit history and assigning a weighted dependency rank to each file pair. The dependency engine 402 of FIG. 4 utilizes a weight function 456 and a time decay function 454 when executing the weight module 442 to cause a processor resource to assign a dependency rank to a file pair. The dependency engine 402 of FIG. 4 executes the graph module 456 to cause a processor resource to create and/or update a dependency graph 442, which is filtered by the filter engine 404 using the confidence rank 408. The filter engine 442 executes the comparison module 444 to cause a processor resource to perform the comparison of a dependency rank to the confidence rank 408. The filter engine 442 executes the removal module 446 to remove any edges of the dependency graph 442 that fail to achieve the confidence rank 408.

The example system 400 provides the filtered dependency graph 442 to the cluster engine 406 to identify a cluster of files that are dependent on each other. The cluster engine 406 of FIG. 4 utilizes program instructions, such as a connection module 448, a split module 450, and an indicator module 452, to facilitate indication of the dependencies in the commit history 410. For example, the cluster engine 406 executes the connection module 448 to cause a processor resource to identify clusters of the dependency graph 442 that have nodes that are not directly connected by an edge, executes the split module 450 to cause a processor resource to split the identified clusters by duplicating the identified clusters and removing nodes and edges associated with nodes that are not directly connected, and executes the indicator module 452 to visually indicate the nodes that have connections representing the likely dependency relationships of the files of the project using a visual indicator as discussed herein. The resulting dependency information 474 is then provided by the cluster engine 408.

Figure 5:
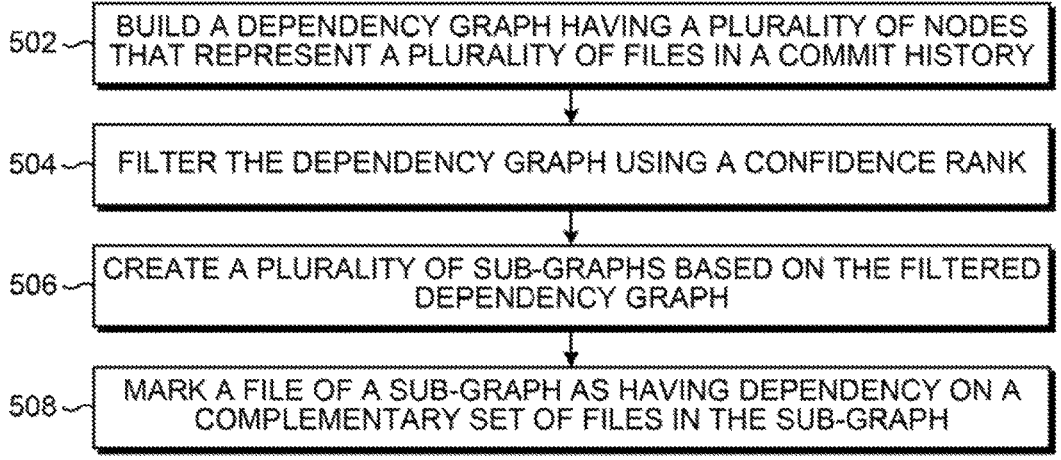
FIGS. 5 and 6 are flow diagrams depicting example methods for finding a dependency of files in a project.

FIGS. 5 and 8 are flow diagrams depicting example methods for finding a dependency of files in a project. Referring to FIG. 5, example methods for finding a dependency of files in a project may generally comprise building a dependency graph, filtering the dependency graph using a confidence rank, creating a plurality of sub-graphs based on the filtered dependency graph, and marking a file of a sub-graph as having a dependency. The example method of FIG. 5 generally comprises operations performable by a dependency identification system, such as dependency identification system 100, as described herein.

At block 502, a dependency graph is built having a plurality of nodes that represent a plurality of files in a commit history. As described herein, the dependency graph includes a plurality of edges among the plurality of nodes based on whether the plurality of files represented by the plurality of nodes are contained in commit log entries of the commit history. The edges are associated with dependency ranks, such as dependency ranks weighted based on the number of times a file pair is committed to the commit history by a distinct committer, where the same flies committed by a separate committer indicates a relationship between the files rather than development strategy, for example. The dependency graph may be built by a dependency engine, such as the dependency engine 102 of FIG. 1.

At block 504, the dependency graph is filtered using a confidence rank. As described herein, a filter engine, such as the filter engine 104 of FIG. 1, may remove edges from the dependency graph that do not achieve the confidence rank or otherwise indicate there may be a lack of confidence in a dependency of a file pair represented by an edge. At block 506, a plurality of sub-graphs are created based on the filtered dependency graph. For example, large clusters of nodes may be split into smaller sub-graphs to narrow the dependencies to be more direct. This may be done via a cluster engine, such as a cluster engine 106 of FIG. 1, by removing nodes of a cluster that are indirectly connected by two or more edges (where the number of edges of a path between nodes representing a file pair indicates an indirect relationship and the greater number of edges indicates a greater degree of indirectness of the relationship.

At block 508, a file of a sub-graph is marked as having dependency on a complementary set of files in the sub-graph. As used herein, a complementary set of files in sub-graph represents the other files of the sub-graph with regard to a particular file in the sub-graph. In this manner, the each file of a sub-graph may be marked as being dependent on the other files of the sub-graph. As discussed herein, a cluster engine, such as the cluster engine 108 of FIG. 1, may perform the marking of a file or otherwise indicate a dependency relationship among a flies, which indication may, for example, be visual or indicated in the data of a dependency identification system, such a flag set in a dependency list of the dependency identification system 100 of FIG. 1.

Figure 6:
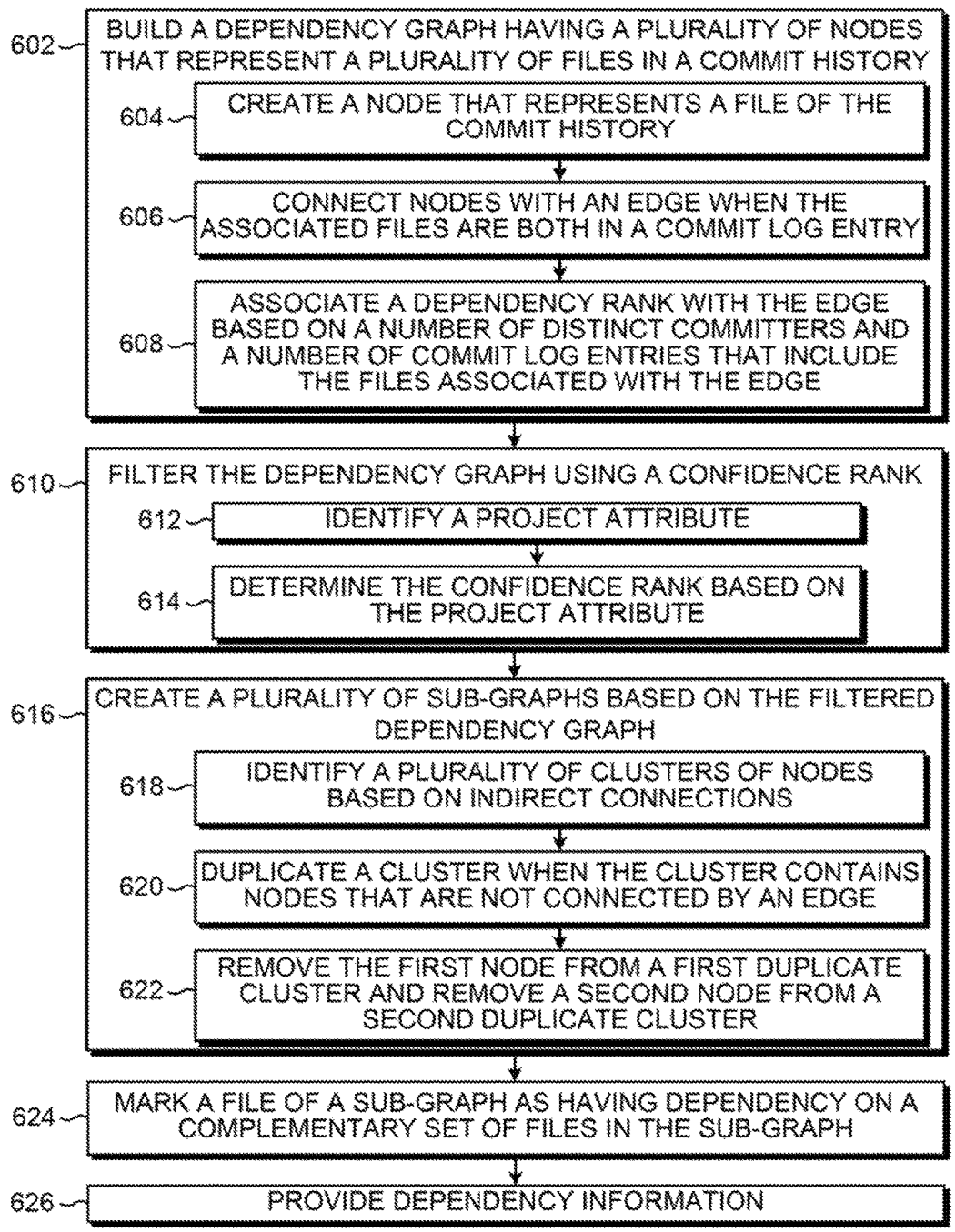

FIG. 6 includes blocks similar to blocks of FIG. 5 and provides additional blocks and details. In particular, FIG. 6 depicts additional blocks regarding providing dependency information and details generally regarding blocks 502, 504, 506, and 508. The example method of FIG. 6 generally comprises operations performable by a dependency identification system, such as dependency identification system 100, as described herein.

As indicated at block 602 of FIG. 6, a dependency graph may be built by creating nodes, connecting nodes with edges, and associating a dependency rank with the edges. At block 604, a node is created in the dependency graph that represents a file of the commit history. For example, a first node of a plurality of nodes is created when the first node does not exist in the dependency graph and the commit log entry contains the first file to be represented by the first node. At block 606, nodes are connected with an edge when the associated files are both in a commit log entry. For example, a first node is connected via a first edge of the dependency graph to a second node of a plurality of nodes of the dependency graph by creating the first edge between the nodes when the first edge does not exist in the dependency graph and the commit log entry comprises the second file that is represented by the second node. At block 608, a dependency rank is associated with the first edge based on a number of distinct committers and a number of commit log entries that include the files associated with the edge, such as the first file and the second file connected by the first edge in the previous example.

As indicated at block 610, a dependency graph may be filtered using a confidence rank by identifying a project attribute and determining a confidence rank based on the project attribute. At block 612, a project attribute is identified, for example, by a filter engine, such as the filter engine 104 of FIG. 1. The project attribute, as discussed herein, may be any appropriate property of the project that may affect a confidence level in a dependency between files. For example, a filter engine may identify at least one of a project size, a number of total commits of the project, and/or a number of committers of the project, where these project attributes may indicate the number of files being worked with which would reflect on the confidence level of any individual commit log entry. A number of file pair appearances in a commit history may seem large for a small project size and may seem small for a large project size. Therefore, the characteristics of the project are to be taken into account when determining the confidence rank as indicated at block 614. For example, the confidence rank may be determined based on at least one of the project size, the number of total commits, and the number of committers. The confidence rank may be determined using a weighted function, a machine learning technique, or otherwise adjusted as the project attributes change.

As indicated at block 616, a plurality of sub-graphs may be created by identifying a plurality of clusters of nodes, duplicating a cluster, and removing a node from the duplicate cluster. At block 618, a plurality of clusters of nodes are identified based on indirect connections in the cluster. For example, a first cluster may be identified where the first cluster of the plurality of clusters is a first group of nodes that do not connect to a second group of nodes, such as after edges of the dependency graph are filtered out for not satisfying the confidence rank determined at block 614. An indirect connection may indicate that a cluster may contain multiple dependency clusters within the cluster. At block 620, a cluster is duplicated when the cluster contains nodes that are not connected by an edge. For example, a first cluster may be duplicated when the first cluster contains a first node and a second node and there is not an edge between the first node and the second node. At block 622, nodes (and associated edges) are removed from the duplicated clusters. Sub-graphs that are smaller than the duplicated cluster are extracted from the each duplicated cluster by creating sub-graphs based on nodes that are identified as not being directly connected in the duplicated cluster. Indirectly connected nodes identified at block 618 are removed separately from the duplicated clusters so that a plurality of sub-graphs are tailored to contain different nodes and/or edges. With reference to FIG. 8 for example, the nodes representing files E and H have been duplicated and the nodes G and F are removed from one graph (due to no direct edge with node D) and the node D removed from the other graph. For another example, a first node is removed from a first duplicate of a first cluster and a second node is removed from a second duplicate of the first cluster, where the first node and second node are not directly connected in the filtered dependency graph resulting from block 610.

The files of the sub-graphs formed at block 616 are accordingly marked as having dependencies on the other files in the sub-graphs at block 624. As discussed above, the marking may be made on the data representation and/or visually presented. The resulting dependency information may be provided at block 626, where the dependency information comprises the files of a file pair that are likely to be dependent on each other. Examples of providing dependency information include at least one of providing a list of dependency clusters in the project based on the plurality of sub-graphs, providing metric information regarding the first sub-graph, providing a list (e.g., a checklist) of dependency files of the first sub-graph associated with a checked-out file retrieved by a developer, and providing a visual representation of the plurality of sub-graphs via a web page (e.g., displaying a filtered dependency graph with dependencies indicated by edges between nodes on a browser application of a client device 336 of FIG. 3). For example, a checklist of configuration file dependencies within a commit history retrieved from a source control tool may be provided to a developer (e.g., a build manager) on an open source project that is working on supporting functionality associated with the set of configuration files by using the example method of FIG. 6.

FIGS. 7 and 8 depict example commit histories and results of identifying dependencies based on example dependency identification systems and/or example methods for finding a dependency of files in a project as described herein. FIGS. 7 and 8 have been described with reference to the descriptions of FIG. 1, but may exemplify the example systems and/or methods described with reference to FIGS. 2-6 as well. Example uses for the example systems and example methods described herein include discovery of configuration file dependencies, architecture cross-layer dependencies, feature dependencies, deployment dependencies, etc.

For example in a first example project, the example systems and/or example methods described herein may detect a cluster of the build configuration files (e.g., pom.xml) when each time a new version is released, a plurality of build files are modified with the release version.

For another example in a second example project, the example systems and/or example methods described herein may detect the clusters related to internationalization configuration files of fifteen languages supported by the project. A developer that is working on internationalization support may be provided with a checklist of dependent files to ensure, for example, that the dependent files are modified correctly. An example benefit of the example systems and/or example methods described herein is that the analysis is language agnostic.

For yet another example in a third example project, a cluster of an external service API, internal service API, and data access layer code may be detected where the data access layer includes a plurality of configuration files that may be detected as part of a sub-graph of the cluster and another sub-graph of the cluster may contain changes in external and internal service APIs as well as the integration tests that are changed as a result.

For yet another example, a central component in a fourth example project may support two types of deployments (such as a local deployment and a remote deployment) where some of the code is different in order to handle these two deployment types, and thus, an extensible markup language (XML) configuration may, for example, need to be modified in response to a change in an annotation. In contrast to static code analysis or a runtime analysis that would likely not detect this type of dependency, the example systems and/or example methods described herein may, for example, detect the dependency between the XML configuration and the deployment annotation.

Although the flow diagrams of FIGS. 4-8 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract and drawings), and/or all of the elements of any method or process so disclosed, may be combined in any combination, except combinations where at least some of such features and/or elements are mutually exclusive.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A system comprising:
   a processor; and
   a storage medium comprising instructions executable by the processor to:
   identify a file pair of a first commit log entry of a plurality of commit log entries in a commit history, the first commit log entry containing a committer identifier and a first set of files that includes a first file and a second file;
   assign a dependency rank to the file pair based on a number of times the first file and the second file appear together in the plurality of commit log entries and a number of distinct committers that commit the first file and the second file together;
   build a dependency graph having a plurality of nodes that represent a plurality of files in the commit history and a plurality of edges among the plurality of nodes based on whether the plurality of files represented by the plurality of nodes are contained in the commit history;
   filter the dependency graph using a confidence rank to remove edges from the dependency graph that do not achieve the confidence rank;
   indicate that the second file is dependent on the first file in response to a determination that the dependency rank of the file pair achieves the confidence rank;
   create a plurality of sub-graphs based on the filtered dependency graph; and
   identify a third file of a first sub-graph of the plurality of sub-graphs as having dependency on a complementary set of files represented in the first sub-graph.

2. The system of claim 1, wherein:
   the confidence rank is based on a project attribute of a project associated with the commit history, wherein the project attribute is at least one of a project size, a number of total commits of the project, a number of changes of a section of the project, and a number of developers of the project.

3. The system of claim 1, wherein the instructions are executable to:
   create, in the dependency graph, a first node that represents the first file;
   create, in the dependency graph, a first edge between the first node and a second node that represents the second file;
   increase the dependency rank of the first edge when a second commit log entry of the plurality of commit log entries contains a second set of files comprising the first file and the second file;
   remove the first edge from the dependency graph when the dependency rank is below the confidence rank; and
   identify a cluster of nodes that are connected in the dependency graph.

4. The system of claim 1, wherein the instructions are executable to:
   determine the dependency rank based on a time decay function that emphasizes a first commit that is committed more recently than a second commit with a greater weighted value than the second commit.

5. The system of claim 1, wherein the instructions are executable to:
   identify a cluster of nodes in the dependency graph based on edges of nodes of the cluster; and
   separate the cluster into the plurality of sub-graphs based on nodes of the cluster that do not have a direct connection, wherein shared nodes among a first sub-graph of the plurality of sub-graphs and a second sub-graph of the plurality of sub-graphs are duplicated.

6. The system of claim 1, wherein the instructions are executable to:
  identify a code pair when a first section of code changes in the first file and a second section of code changes in the second file;
  determine a regularity of the code pair based on a number of times the first section of code and the second section of code change together in the commit history; and
  modify the dependency rank associated with the file pair based on the regularity.

7. A non-transitory computer-readable storage medium comprising a set of instructions executable by a processor resource to cause the processor resource to:
  identify a file pair of a first commit log entry of a plurality of commit log entries in a commit history, the file pair including a first file and a second file;
  assign a dependency rank to the file pair based on a number of times the first file and the second file appear together in the plurality of commit log entries and a number of distinct committers that commit the first file and the second file together, wherein the first file is represented by a first node of a dependency graph, wherein the first node is connected by an edge to a second node of the dependency graph representing the second file;
  build a dependency graph having a plurality of nodes that represent a plurality of files in the commit history and a plurality of edges among the plurality of nodes based on whether the plurality of files represented by the plurality of nodes are contained in the commit history;
  filter the dependency graph using a confidence rank to remove edges from the dependency graph that do not achieve the confidence rank, the confidence rank based on a number of commit log entries in a commit history;
  identify a dependency between the first file and the second file in response to a determination that the dependency rank achieves the confidence rank;
  create a plurality of sub-graphs based on the filtered dependency graph; and
  identify a third file of a first sub-graph of the plurality of sub-graphs as having dependency on a complementary set of files represented in the first sub-graph.

8. The medium of claim 7, wherein, when the commit log entry contains a set of files that includes the first file and the second file and the dependency graph does not contain the first node and the second node, the set of instructions is executable by the processor resource to:
  add the first node to the dependency graph and the second node to the dependency graph; and
  create the edge between the first node and the second node.

9. The medium of claim 7, wherein the set of instructions is executable by the processor resource to determine the dependency rank based on a time decay function that emphasizes a first commit that is committed more recently than a second commit with a greater weighted value than the second commit.

10. The medium of claim 7, wherein the set of instructions is executable by the processor resource to:
  identify a cluster of nodes in the dependency graph based on edges of nodes of the cluster; and
  separate the cluster into the plurality of sub-graphs based on nodes of the cluster that do not have a direct connection, wherein shared nodes among a first sub-graph of the plurality of sub-graphs and a second sub-graph of the plurality of sub-graphs are duplicated.

11. A method for finding a dependency of files in a project comprising:
  identifying a file pair of a first commit log entry of a commit history, the file pair including a first file and a second file;
  determining a dependency rank for the file pair based on a number of times the first file and the second file appear together in the commit history and a number of distinct committers that commit the first file and the second file together;
  building a dependency graph having a plurality of nodes that represent a plurality of files in the commit history and a plurality of edges among the plurality of nodes based on whether the plurality of files represented by the plurality of nodes are contained in the commit history;
  filtering the dependency graph using a confidence rank to remove edges from the dependency graph that do not achieve the confidence rank;
  determining whether the dependency rank of the file pair achieves the confidence rank;
  identifying a dependency between the first file and the second file in response to a determination that the dependency rank of the file pair achieves the confidence rank;
  creating a plurality of sub-graphs based on the filtered dependency graph; and
  marking a third file of a first sub-graph of the plurality of sub-graphs as having dependency on a complementary set of files represented in the first sub-graph.

12. The method of claim 11, wherein building the dependency graph comprises:
  creating a first node of the plurality of nodes that represents the first file when the first node does not exist in the dependency graph and the commit log entry contains the first file;
  connecting, via a first edge of the plurality of edges of the dependency graph, the first node to a second node of the plurality of nodes that represents the second file when the first edge does not exist in the dependency graph and the commit log entry comprises the second file; and
  associating the dependency rank with the first edge based on the number of distinct committers, a time decay function, and the number of commit log entries that include the first file and the second file.

13. The method of claim 11, wherein filtering the dependency graph comprises:
  determining the confidence rank based on the at least one of the project size, the number of total commits, and the number of committers.

14. The method of claim 11, wherein creating the plurality of sub-graphs comprises:
  identifying a plurality of clusters of nodes, where a first cluster of a plurality of clusters is a first group of nodes that do not connect to a second group of nodes;
  duplicating a first cluster when the first cluster contains a first node and a second node and there is not an edge between the first node and the second node; and
  removing the first node from a first duplicate of the first cluster and the second node from a second duplicate of the first cluster.

15. The method of claim 11, comprising at least one of:
  providing a list of dependency clusters in the project based on the plurality of sub-graphs;
  providing metric information regarding the first sub-graph;

providing a list of dependency files of the first sub-graph associated with a checked-out file retrieved by a developer; and providing a visual representation of the plurality of sub-graphs via a web page.

* * * * *